(12) United States Patent
Russell et al.

(10) Patent No.: US 7,020,630 B2
(45) Date of Patent: Mar. 28, 2006

(54) COMPUTER ASSISTED SECURITIES TRADING

(76) Inventors: John Russell, 80001 Tribal Cir., Las Vegas, NV (US) 98102; Jack W. Selden, 3237 E. Briarcliff Rd., Birmingham, AL (US) 35223; B. Mahlon Brown, III, 2712 Colanthr, Las Vegas, NV (US) 89102

( * ) Notice: Subject to any disclaimer, the term of this patent is extended or adjusted under 35 U.S.C. 154(b) by 281 days.

(21) Appl. No.: 09/729,012

(22) Filed: Dec. 1, 2000

(65) Prior Publication Data

US 2002/0095364 A1  Jul. 18, 2002

(51) Int. Cl.
  *G06F 17/60* (2006.01)
(52) U.S. Cl. ..................... 705/36 R; 705/35
(58) Field of Classification Search ............. 705/35, 705/36, 37, 36 R
  See application file for complete search history.

(56) References Cited

U.S. PATENT DOCUMENTS

| | | | |
|---|---|---|---|
| 4,412,287 | A | 10/1983 | Braddock, III |
| 4,674,044 | A | 6/1987 | Kalmus et al. |
| 5,101,353 | A | 3/1992 | Lupien et al. |
| 5,297,031 | A | 3/1994 | Gutterman et al. |
| 5,950,176 | A | 9/1999 | Keiser et al. |
| 5,963,923 | A | 10/1999 | Garber |
| 6,014,643 | A | 1/2000 | Minton |
| 6,029,146 | A | 2/2000 | Hawkins et al. |
| 6,105,005 | A | 8/2000 | Fuhrer |
| 6,125,355 | A | * 9/2000 | Bekaert et al. ........... 705/36 |

FOREIGN PATENT DOCUMENTS

WO    WO9634357    * 10/1996

OTHER PUBLICATIONS

Pettengill, Glenn N., "Daily Return Correlations: A Reexamination", Quarterly Journal of Business and Economics, Summer 1989; 28, 3; ABI/INFORM Global, p. 122.*

* cited by examiner

*Primary Examiner*—Lalita M. Hamilton
(74) *Attorney, Agent, or Firm*—I. Michael Bak-Boychuk

(57) ABSTRACT

A securities trading system utilizes distributed data processing effected by a central processing station and a plurality of processing consoles all tied to a common network. The central station includes several computation sequences that can be used to compute the autocorrelation distribution function of any one security price to predict the probable price variation increment within a contract consummation interval, the cross correlation between various securities to determine any pattern of offsetting trades, and a reconciliation sequence to effect the securities transactions within the price variation increment. The autocorrelation and cross correlation sequences can be transferred for processing in one of the consoles, thereby allowing for a distributed processing arrangement of a plurality of securities patterns, and the computation results can be displayed on the console monitor that is interested in the particular security. A price increment selected for a particular level of probability is included in each buy and sell offer and if the offers intersect a transaction is consummated. The ratios of the buy and sell increments are then used to distribute the price overlap.

8 Claims, 7 Drawing Sheets

COMPUTER ASSISTED SECURITIES TRADING

BACKGROUND OF THE INVENTION

1. Field of the Invention

The present invention relates to a process for effecting computer assisted securities transactions, and more particularly to a distributed processing system for computing the statistical probabilities of short term securities price trends and thereafter automatically settling securities trades.

2. Description of the Prior Art

The dynamics of motion of a stock or commodities market has been the subject of numerous books and articles. At the core is the fundamental departure of the market from the basics of a contract, i.e., the requirement of an offer and an acceptance. In place of these basic contract conditions the market seeks to match two remote parties making two offers, one to sell and the other to buy, and it is this matching process that has produced all the notions of a "broker", "market maker" or "specialist." Simply, this intermediary is currently needed in order to produce a contract at both the selling and buying ends.

The necessary presence of a market maker or specialist, however, has limited computer effected market transactions. As a result numerous solutions have been devised in the prior art which in one manner or another seek to replace the live market maker with an automatic process. Examples of such automated techniques can be found in U.S. Pat. No. 4,674,044 to Kalmus et al., U.S. Pat. No. 5,250,176 to Keiser et al., and others. While suitable for the purposes intended, each of the foregoing techniques relies on a set of basic operational parameters which, for example, report trading prices at some arbitrary time intervals, create a virtual market maker with arbitrary price limits on its trading authority, or impose other arbitrary constraints which are caused by artificial limitations in the method used and not by the market dynamics themselves.

These real or synthetic arbitragers, market makers and specialists are all deemed necessary because of a communication deficit that has heretofore existed. Simply, a contract mechanism assumes a direct, even face-to-face, transaction which in the earlier world of limited communications just simply could not be done at a distance. Intermediaries were therefore created. When their number accumulated all sorts of opportunities came into existence within the contract process itself and the influence of a "market makes" or "specialist" in the early stock market days has been legendary.

This 'middle man' influence persists even now, at the zenith of the 'information revolution'. One need only inspect some of the recent rulemaking and rule change endeavors pursuant to Section 19(b) of the Securities Exchange Act of 1934, and particularly the NASD Order Handling Rules that were phased in after 1996, for an indication of the significance of the market maker on the market. Particularly lucid is the Limit Order Display Rule that compels the market maker to display basic information, i.e., more favorable limit orders than those offered by the brokerage. Simply, the force of regulation is applied to compel disclosure of what was there for the taking, i.e., revelation of the details of the order concealed by the broker.

Thus a physical limitation from the past has created its own, sometimes overwhelming, impact on the marketplace dynamics that persists even after the limitation is gone. Similar past limitations in the settlement process and the subsequent banking transaction have further distorted the market mechanism, and the convenience of credit facility has increased the influence of market makers, arbitragers and brokers even more. Significantly, information relating to the clients' needs for lateral offsets that became available within the brokerage or market making enterprise allowed for yet further market influence.

Each of the foregoing is not necessarily associated with some notions of malevolence. Simply, the brokering enterprise is exposed to a much larger flow of information which will inherently affect those decisions that are purely arbitrary and while the current statutory and regulatory architecture may focus on market manipulation and the like there is no possible regulation of conduct that in all essentials appears intuitive.

Recent advances in technology have effectively removed the need for these intermediaries by increasing both the range of the participants' virtual sensorium and also by increasing participants' information processing facility. Thus the individual investor can now be virtually present right in the "trading room," viewing the stream of offers made and, if desired, accepting one or more of them. As result the intermediary can be wholly omitted in today's level of technology. What is then left is the phase lag that is inherent in all dynamic systems, a buy and sell order mismatch that can be reduced by including in the order a set of price brackets that are based on the current statistical pattern of the market.

Unconstrained by the influences of a brokerage or arbitrage mechanism, the dynamics of a marketplace are similar to the dynamics of many other natural systems. In their simplest form natural oscillatory systems are statistically expressed by their spectral energy distribution, or their power spectral density, and their relationships (equations) of motion, elegantly stated by cross and autocorrelation functions. The computations of various predicted measures using these mechanisms are well known in physical science. For example the prediction of mean time between exceedance in wind shear is regularly done on the bases of the power spectrum and autocorrelation of atmospheric turbulence, as are computations of exceedances in background radio noise and even ocean wave predictions.

More importantly, these natural processes have been earlier accommodated in the evolved logic of the process participants. In a market process each buy-sell exchange is based on the participants' own perceptions, processed by evolved analogical (or even intuitive) rationales, where each participant makes his or her own observations and based on these makes the buy-sell decision and enters into the contract. This process was evolved as part of all communication facility and is therefore an integral part of all evolved logical organization.

Until recently the foregoing interchanges were all at arms length. Remote transactions are a new phenomenon and therefore have had little evolved accommodation. More importantly, remote transactions are always associated with a lack of observable information which in itself evokes fear and reticence in any exchange. Thus what is invisible to the individual decision maker, like the various motivations of the intermediary, also creates distortions. This overlay creates its own effects which often mask the natural dynamics of the marketplace. (One may want to note that the intermediaries' overlay is not necessarily malevolent. Often it is just simply there and by its presence creates apprehensions and even blinds the senses of the individual market participant.)

For all these reasons a technique that both omits the intermediary in stock market transactions while also selecting the most informative samplings is therefore desired and it is one such technique that is disclosed herein.

SUMMARY OF THE INVENTION

Accordingly, it is the general purpose and object of the present invention to provide an automated securities trading system which compensates for the phase lag between the instantaneous price offered and the transaction price.

Other objects of the invention are to provide a computer network implemented securities trading system in which the prices of the securities offer and acceptance are both compensated by the contract lag.

Further objects of the invention are to provide an automated securities trading system in which both the sides of the securities contract are automatically compensated in price in accordance with a predicted statistical ratio selected by the participants.

Yet additional objects of the present invention are to provide an automated securities trading system in which the various market correlation functions are displayed in accordance with their correlation ranking.

Briefly, these and other objects are accomplished within the present invention by providing a computer communication system to which various participating consoles are connected, each of the consoles effectively providing a trading station through which automated securities trades can be carried out. Also connected to the network is a central processing facility which controls the data transfers on the network and in which the various trading orders from the various consoles are sorted, matched for best fit and automatically reconciled.

In this process those buy and sell orders that are immediately matched up are also immediately settled in accordance with their priority (e.g., first-in, first-out). Those orders that have no immediate match are then compared to see if a match can be obtained within the specified increments of the sale price, increments specified in each buy and sell order in a manner similar to a stop limit order under the current practice. This reconciliation is effected for each trading order and to accommodate the several alternatives for a match various computation are available at the request of the console user, including an autocorrelation sequence which will inform the user of the statistical consequences associated with any selection of an increment. Viewing these computation results the user can then select the price brackets that best satisfy his or her risk desires. In this manner all of the contract particulars can be specified, including any bracketing increments, and a contract can therefore be completed automatically.

These computations of the probabilities that a transaction will conclude within a specified bracketing interval are obtainable from a continuously computed solution of the autocorrelation function computed at any given instance at the current time lag between the preceding purchase or sale order and the transaction itself. Once the correlation distribution is determined a price bracket can then be set around the order. This bracket is therefore a statistical prediction (e.g., one standard deviation, two standard deviations and so on) at which the investor wants to hold his or her transaction success risk. Accordingly, for contract purposes the order particulars are absolutely certain; the investor is willing to buy or sell x number of shares of a particular security at a y price +or − a z deviation. The only thing that is uncertain is whether the order will be accepted and in accordance with the inventive process the investor will be advised that the order will be executed at a statistical incidence w out of 100 times. Of course, the same statistical computations are also on the opposite side of the transaction and should there be offsetting orders, such are then automatically matched and immediately executed.

Those in the art will appreciate that the foregoing process results in an effective feedback loop as the most realistic (most probable) orders will be immediately transacted. The time delay between the order and the transaction will therefore commensurately shrink, further improving the precision level of the mathematical model which then makes the statistical prediction even more certain. This will have the tendency of removing the clutter of unrealistic orders from the table.

Since these same bracketing decisions may be made in other covering transactions, the feedback aspects of the process become even more pronounced. It will be appreciated that most of the orders to buy must be preceded by very realistic orders to sell for the bank book to remain in balance, and a closed, automatic regulation system is therefore effected by this inventive process. The large phase differences between the buy and sell orders are thus virtually eliminated, eliminating the need for market makers and the like.

This same computation process is useful in resolving spatial correlation, i.e., correlation between or across various indices, stock exchanges and individual securities. These correlation functions may be displayed, individually or in matrix form, along with any news or press release signals that may relate to a security. As result each of the investors that is serviced by a console can view the general information on the main video screen or may select any particular correlation function of interest for local display. Once so informed the investor can then select the trade in the manner described above. The central processing system then maintains the orders in various sort matrices, segregated for each security, by time, amount and volume, and once the orders are matched appropriate credits or debits are entered for each investor.

The foregoing processing functions may be carried out on a distributed basis with each console participating in the task. Thus if a particular trading console needs to consider the statistical consequences of a particular bracketing limit on an order, the computation sequences therefor can be brought down from the central facility and then locally carried out. All the other consoles requesting the same information will then be directed to the console that has first assumed the task. In this manner a distributed processing cooperative is formed where each console is part of the system.

DESCRIPTION OF THE PREFERRED EMBODIMENT

Figure 1:
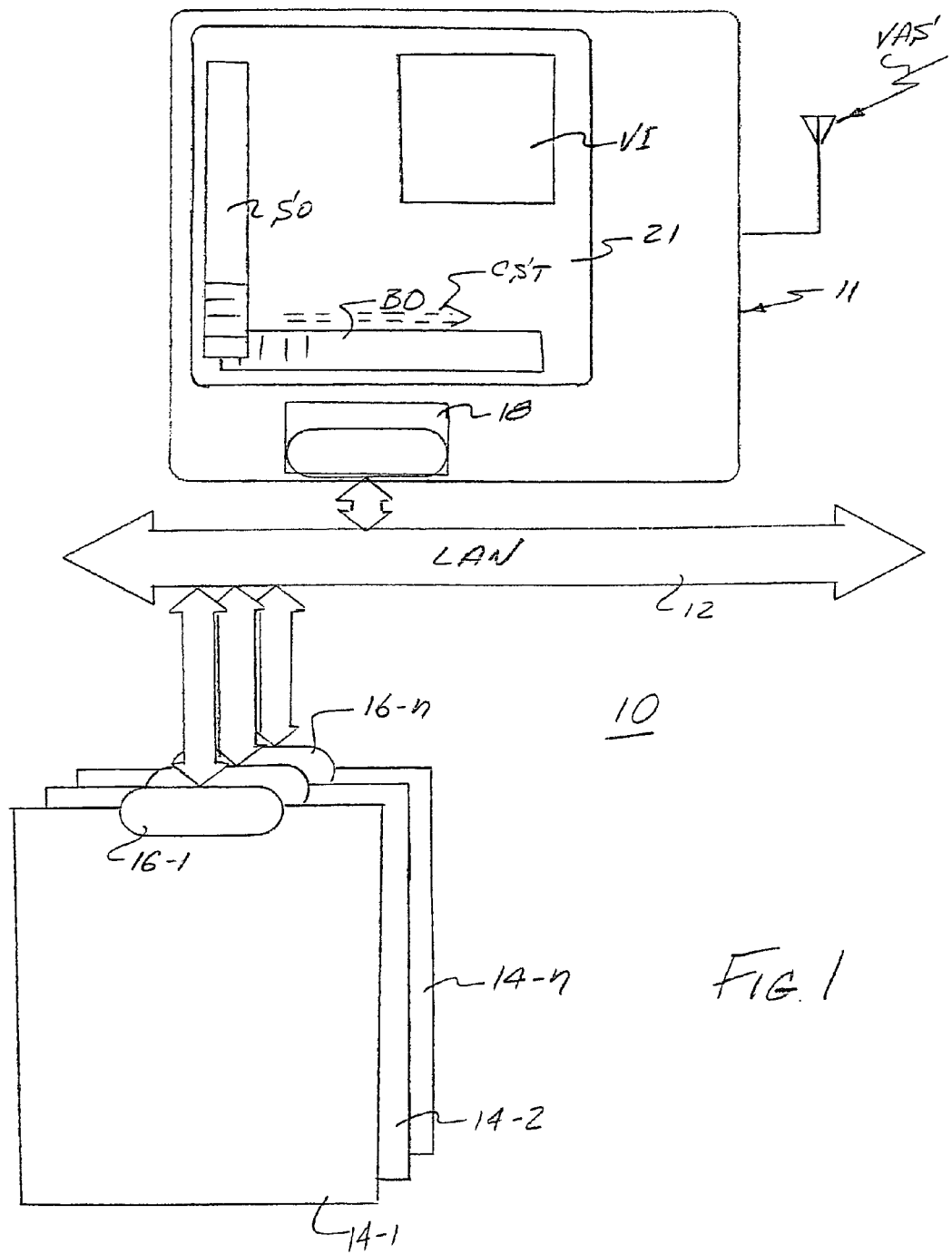
FIG. 1 is a diagrammatic illustration of a dedicated computer communication system conformed to effect electronic securities trading in accordance with the present invention.
Figure 2:
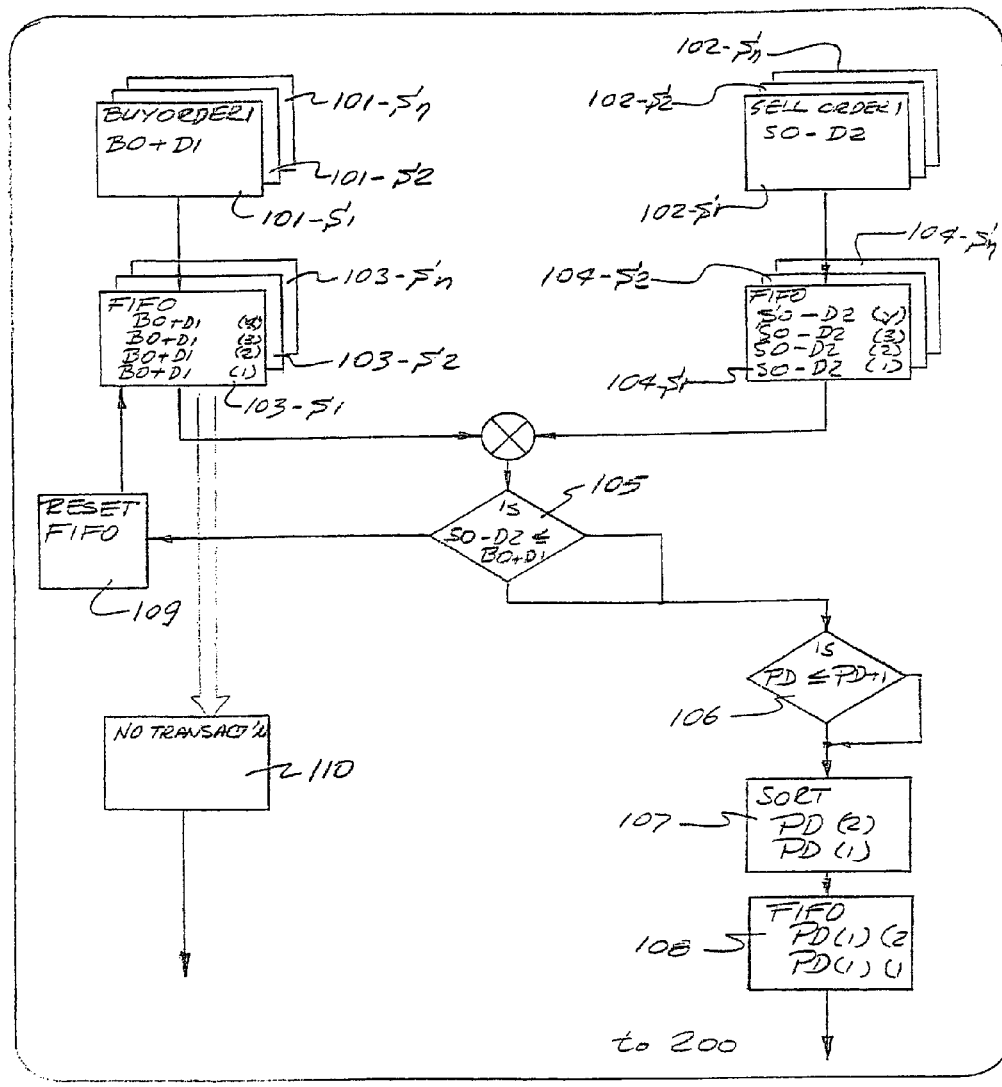
FIG. 2 is a flow chart of the inventive trade reconciliation process conformed to select bracketing increments around a securities trade order that has a preselected probability level of acceptance.
Figure 3:
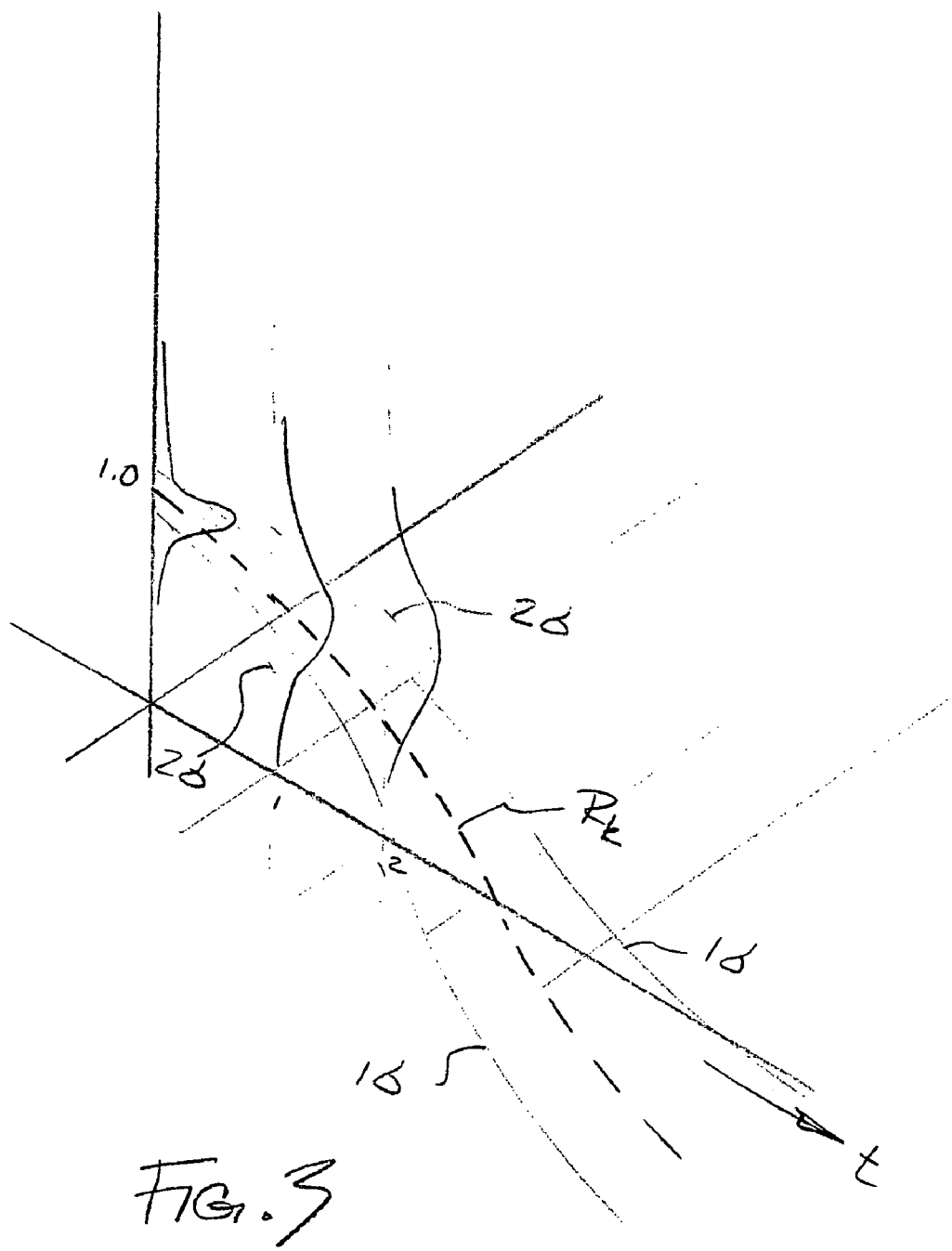
FIG. 3 is an exemplary graph of an autocorrelation distribution function for various securities.

As shown in FIGS. 1–3, the inventive securities trading system, generally designated by the numeral 10, is organized about a central data processing station 11 tied preferably by a Local Area Network (LAN) 12 to a plurality of remote consoles 14-*l* through 14-*n*. Each of these remote consoles 14-*l* through 14-*n* may be located in an area of some convenience 15 for the trading patrons. Moreover, to assure the necessary level of security each of the remote, stations 14-*l* through 14-*n* may be provided with an encryption encoder/decoder 16-*l* through 16-*n* conformed to match the encryption convention utilized by the central processing station 11.

The central processing station is also conformed to receive the video and audio signal VAS provided by any of a group of selected commercial news service providers which may be a direct feed from a news carrier devoted to financial information or even a live interview of one or more corporate officers making some public announcement. The audio part of the signal may then be amplified in synchronism with the video portion displayed as a video image VI on one part of a video screen 21. Also displayed on the screen may be the various securities selling offers SO and buying offers BO arranged in an orthogonal, crossing data strips VS and HS sequenced in accordance with the highest cross correlation ranking therebetween. Graphic illustrations of various autocorrelation probabilities of the transaction success for any security of current interest can also be displayed.

In accordance with the present invention each of the selling offers SO and buying offers BO also include in their specifics an upper and a lower price limit respectively D1 and D2, computed in the course of execution by the central processing station 11 the sequence of steps shown in FIG. 2. These selling and buying offers SO and BO remain untransacted, regardless of the volume, as long as the buying offers BO+D1 are outside of the range of the selling offer SO–D2. Should these overlap the transaction is immediately reconciled in a sequence of steps shown in FIG. 4, with appropriate credit and debit booked to the selling and buying console. All these computations and reconciliations are carried out in a processing stage 18 within the central processing station 11 which also computes, on a continuous basis, the cross correlation of various securities and then provides for display, in a histogram form illustrated in FIG. 8, the probability of the offsetting exchanges in accordance with one, two or three standard deviations. The investor can therefore assess the statistical patterns of the market.

It is to be noted that the foregoing inventive process is self limiting. By viewing the same histogram the investor whose offer was left unaccepted is advised of the statistical probability that the offer, with all its limitations (intervals), will be accepted within the realistic future. To that extent the autocorrelation function is particularly informative as the function typically goes to zero after any significant time interval. Stated otherwise, the probability of a successful transaction diminishes with time and the investor will have to reconsider all those offers that are left untransacted for any significant period.

Referring back to FIG. 2, the buy orders BO are received in step 101-S1 to 101-Sn for each security S1 through Sn. At the same time the sell orders SO are received in step 102-S1 through 102-Sn again for each security S1 through Sn. Each of these is at a particular price together with bracketing price intervals D1 and D2. As each of these is received the orders are arranged in a corresponding first-in-first-out FIFO stack 103-S1 through 103-Sn and 104-S1 through 104-Sn. The end orders at the output of each FIFO stack are then compared in step 105 to see if the buy order BO price plus the allowable increment D1 is greater than the sell order SO price minus any allowable increment D2. If yes then the remaining sell orders SO in the FIFO stack of step 104-S1 are cycled through the same comparison 105, one by one, each time providing a price difference PD which is compared in step 106 against the prior price difference and if it is less the new sell order SO is substituted for a match up with the buy order BO.

Of course, more than one potential sell order SO candidate can result even after this matching process. Accordingly, in step 107 all the matching sell order candidates are sorted by the increment D2 with the highest increment given sort priority. These are then collected in yet another FIFO stack 108 and the first one out is then sent as a consummated transaction to the account reconciliation sequence 200 illustrated in FIG. 4. Included in this reconciliation is the fee paid to the system operator that may be distributed between the seller and buyer based on the relative size of D1 and D2 as shall be more precisely described below.

The foregoing sequence assumes a positive branching at step 105. If, however, the buy order at the output of the FIFO stack in step 103-S1 through 103-Sn is outside the range of the corresponding sell order the condition in step 105 is not met and the other output of this step then enables step 109 which resets the FIFO of step 103-S1 returning the failed buy order to the top of the stack. The sequence is then cycled through, once again testing the condition in step 105, until all the buy orders are either transacted or returned to the stack. Stated otherwise, the process keeps attempting to close the orders until the process fails. This state is recognized by decoding the tag integer column of the FIFO stack in step 110 to see if all of the buy orders are outside the range of all the sell orders. This is then indicated on the video screen 21 as a color change in the SO and BO symbol display of the security S1. Of course, the same sequence is carried out for all other securities S2 through Sn that are traded.

Figure 4:
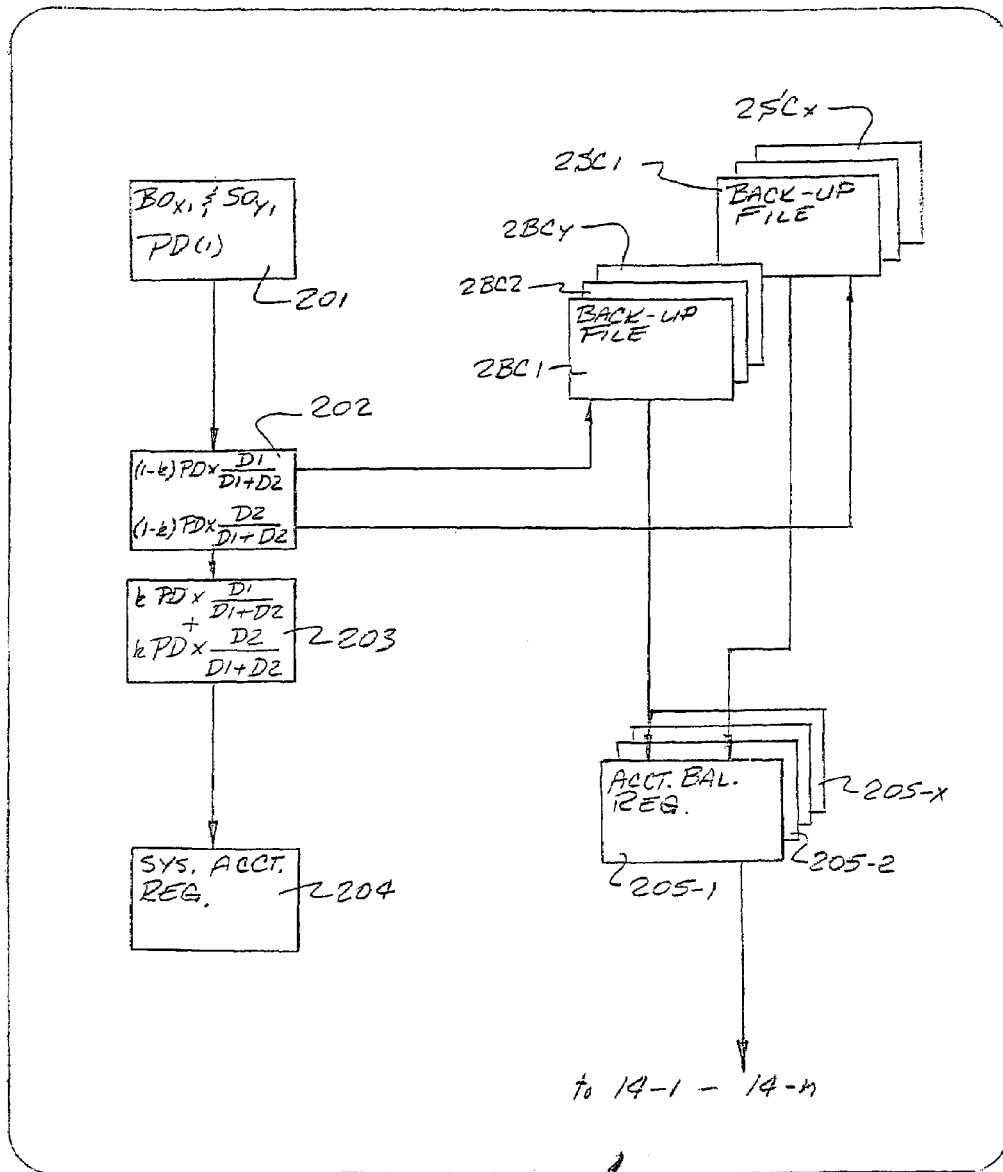
FIG. 4 is yet another flow chart of an account credit and debit process useful with the present invention.

As shown in FIG. 4, the reconciliation sequence, generally designated by the numeral 200, receives in step 201 the matching sell order SO and buy order BO together with the price difference PD. These are each associated with identifiers of the selling client SC1 through SCx and buying client BC1 through BCy. At the same time the client's back-up files 2BC1–2BCy and 2SC1–2SCx are incremented and decremented by the transaction amount and transaction fee, by apportioning in step 202 the price difference PD between the seller and the buyer by a ratio of the increments D1 and D2 that each has selected. In those instances where a fee is charged for each completed transaction a portion of the price difference PD may be similarly computed in step 203 and thereafter accumulated in a system holding account register 204. These various deductions and distributions are also reconciled in account balance registers 205-1 through 205-x corresponding to each client's account.

Those in the art will appreciate that in any steady state market process the last transaction price for a commodity, security or any other standardized item will be both the BO and SO price adjusted for any brokerage fee. Accordingly, the principal item of interest is the allowable interval D1 and D2 by which that the seller or buyer are willing to depart from this previously successful transaction. In a down market trend there will be some resistance by the seller to reduce the price while an up market will feel the resistance of the buyer. In each instance, however, a delay in consummating the transaction will produce a risk consequence in either one or the other direction and it is this delay that is minimized by the appropriate selections of D1 and D2.

Figure 5:
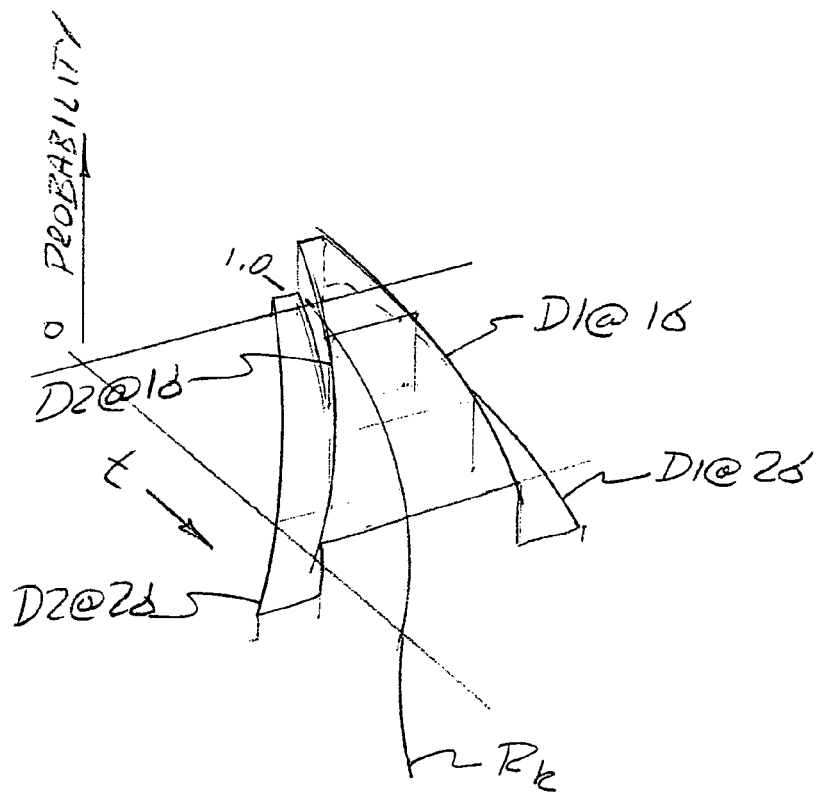
FIG. 5 is an exemplary graph of an autocorrelation function of a selected security price variation with time interval, illustrating the price interval at several levels of probability of a successful contract consummation.
Figure 6:
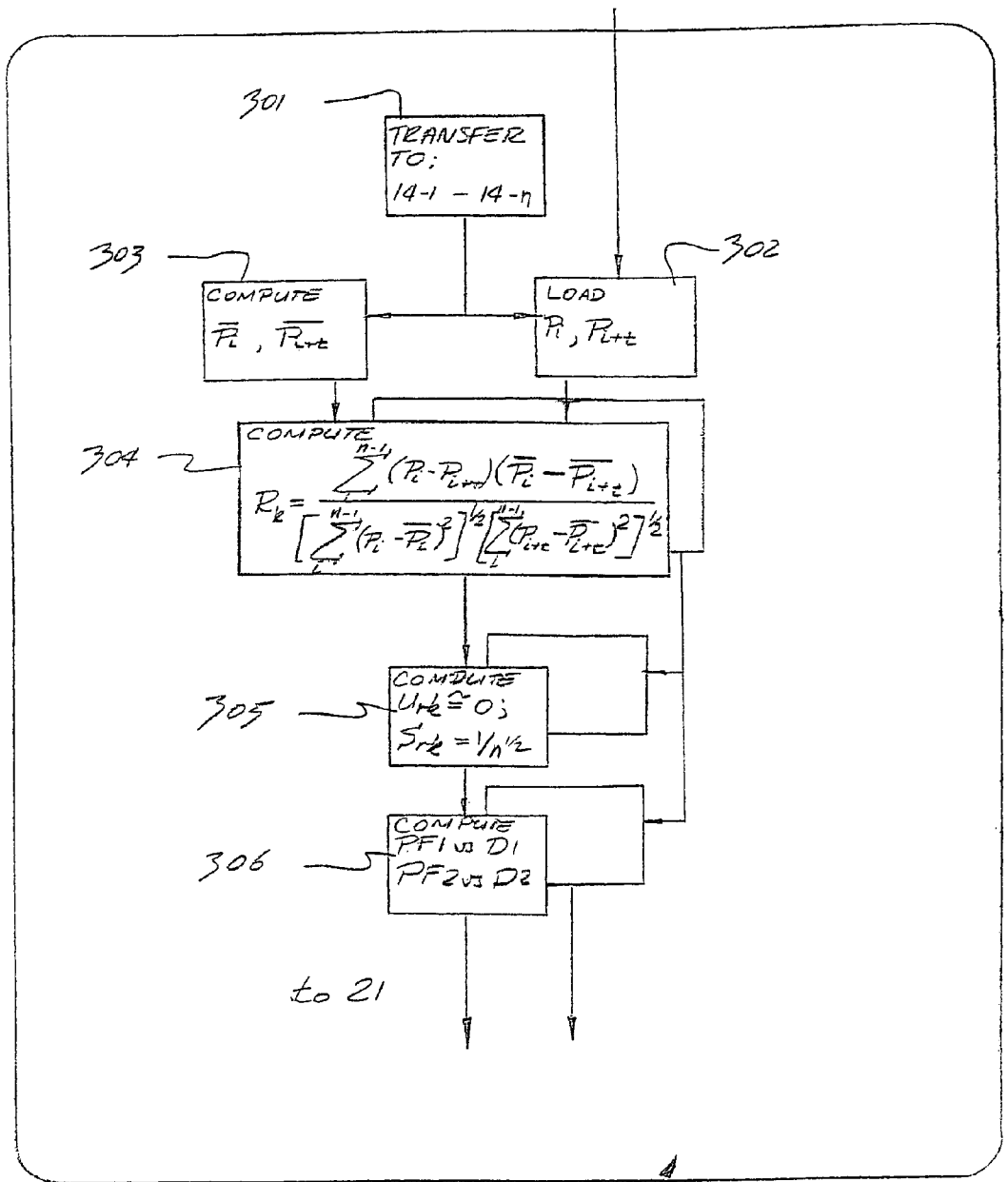
FIG. 6 is a further flow chart of a subroutine useful in computing the autocorrelation functions shown in FIG. 5.

To assist the investor in the selection of D1 and D2 a computation sequence, shown generally at 300, is carried out according to the steps shown in FIG. 6, with the results of the computation displayed on the screen as a plot PA of autocorrelation probability distributions for various values of D1 and D2 illustrated in FIG. 5. More precisely the computation sequence 300 can be invoked by an investor for any security S1 through Sn, with the sequence then transferred from the central processing station 11 to the requesting console 14-1 through 14-n in step 301. Once loaded into the processor of the requesting console the sequence 300 will then execute an autocorrelation analysis of any selected security by loading into step 302 a time sequence of the reported transaction price Pi and Pi+t. In step 303 the mean values of Pi and Pi+t are computed over a statistically significant interval (e.g., fifty transactions) and the autocorrelation computation is carried out in step 304 in accordance with the following relationship:

$$R_k = \frac{\sum_i^{n-1}(P_i - P_{i+t})(\overline{P_i} - \overline{P_{i+t}})}{\left[\sum_i^{n-1}(P_i - \overline{P_i})^2\right]^{\frac{1}{2}}\left[\sum_i^{n-1}(P_{i+t} - \overline{P_{i+t}})^2\right]^{\frac{1}{2}}}$$

where Rk describes the autocorrelation of Pi and Pi+t and t at the time lag at which the price sampling is made. In step 305 the sampling distribution of the autocorrelation coefficients Rk is normalized with Urk=0 and Srk=1/n**½ where U and S are the mean and the variance which is then restated in step 306 as a random probability functions PF1 and PF2 of the price increments D1 and D2. It is these probability functions that are then mapped in FIG. 5 to be displayed for the investor who then uses these to increase the probability of a successful securities transaction.

It is to be noted that by virtue of this process an effective feedback loop is created that forces the whole set of transactions to the most probable conditions, as those that are less probable are more likely to be left out. In consequence, the resulting autocorrelation functions will more closely follow the natural mass dynamics of the marketplace instead of the extraneous influences of brokers and middle men. At the steady state, closed loop conditions this feedback mechanism will therefore produce a market mechanism that is more likely to be influenced by outside events and the management decisions of the enterprises that are sold as securities.

It will be further appreciated that the above arithmetic processing functions do not need to be specifically allocated to a particular remote console. For example, if console 14-2 is directed to compute the autocorrelation distributions of a particular stock issue S2 then these same computations do not need to be repeated elsewhere. Accordingly, the system described herein contemplates distributed processing, and reference should be had to FIG. 7 where the various signal exchanges associated with such a processing arrangement are shown.

Figure 7:
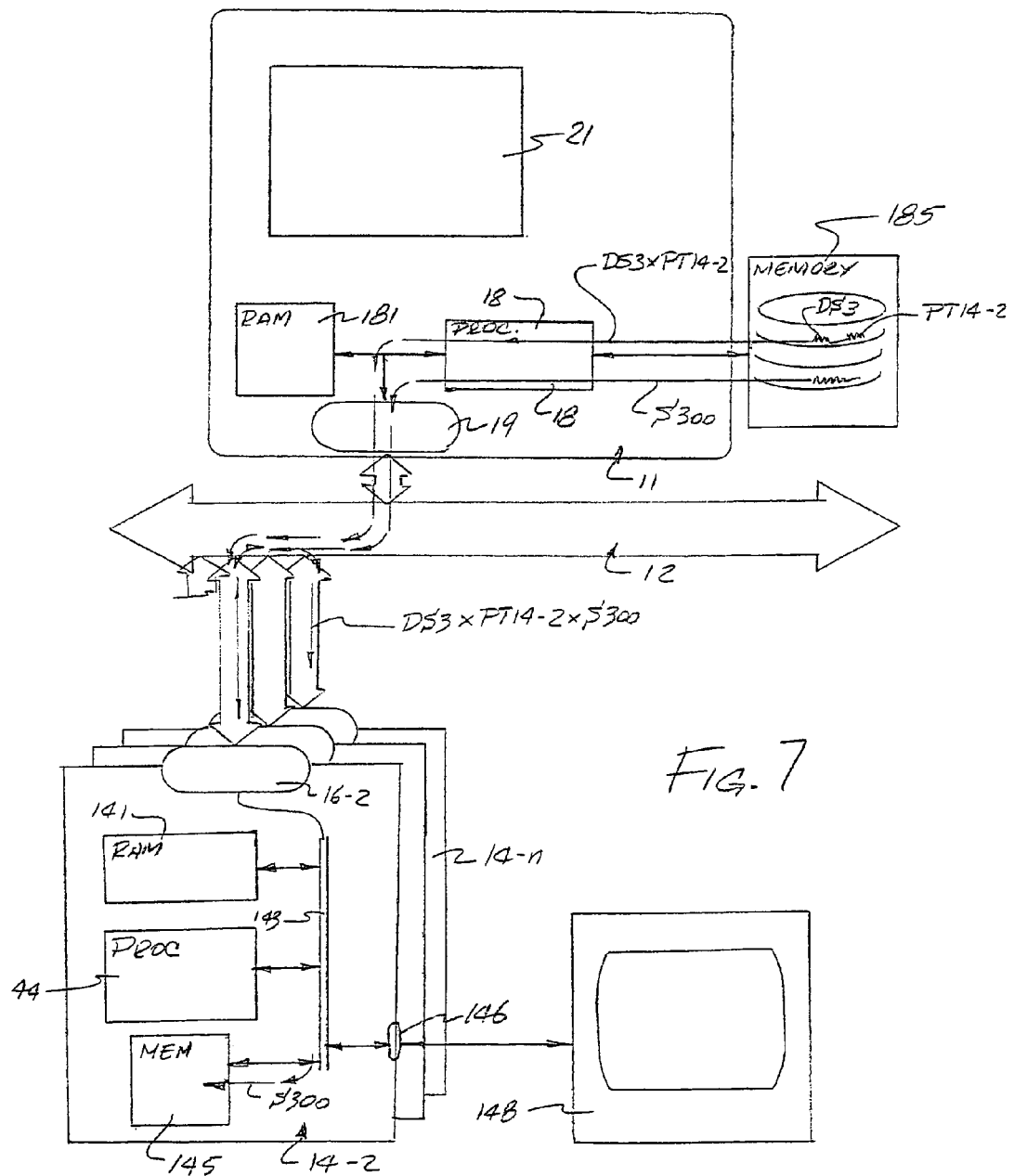
FIG. 7 is an over-all system schematic illustrating the inventive general processing flows through the central processing station.

More precisely, as shown in FIG. 7 the central processing station 11 includes its processing stage 18 which may be provided with the necessary encryption facility 19 for communicating with the encrypted user consoles 14-1 through 14-n, a scratch pad [RAM] memory 181, a processor 182 and a bulk storage disc file 185 on which the data relating to the various securities S1 through Sn may be stored together with the processing sequences described herein. On each occasion that one of the consoles 14-1–14n is engaged in carrying out the computations of the processing sequence 300 the data corresponding to the particular security S1–Sn is tagged with a pointer to the particular console 14-1–14-n. The next request for the same computations is then routed directly to this specific console and no redundant processing needs to be made.

For example, continuing the illustration earlier commenced, when console 14-2 elects to compute the correlation distributions of a security S3 the computation sequence 300 is brought down from storage 185 to the main memory 145 of the console, shown by the signal path S300. Thereafter the data related to security S3, shown as a data stream DS3, is transferred on a continuing basis to the scratch pad memory 141 of the console to be processed in accordance with the sequence 300 in processor 144. Of course, each console also includes its own bus 143 and various I/O ports 146 connecting to a local video display 148.

As this computation is carried out on the processing system of console 14-2 the data field on the disc storage 185 corresponding to the data DS3 is tagged with a pointer PT14-2 and thereafter any other console that is requesting the same computations, e.g., console 14n, is directly branched to console 14-2. In this manner the processing of the various autocorrelations of interest is distributed amongst the consoles, reducing the processing load of the central processing station 11. Of course, the other processing assignments, like those imbedded in sequences 100 and 200, can be similarly distributed. As result a shared processing cooperative is devised by which all the data management necessary for correct buy and sell order particulars and the consequent matching can be carried out.

Figure 8:
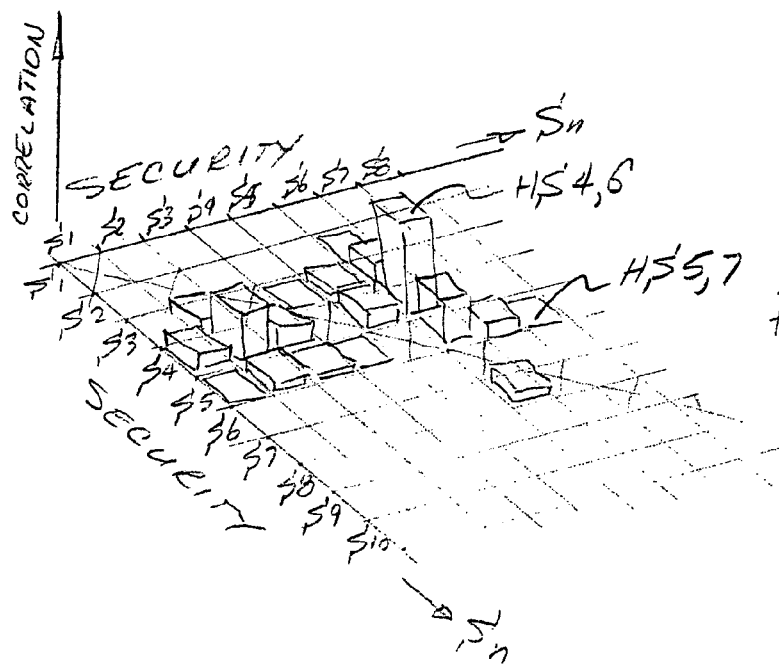
FIG. 8 is a three-dimensional histogram of the typical cross correlation of settlement probabilities in accordance with the present invention.

This matching can be 'local' or focused on one particular stock issue, or may be more 'global' by comparing the cross-correlations between indices, funds or stocks and even between stock exchanges. For example, the computation process 300 may be provided with a further step 308 in which the correlation coefficient is computed on across stock issues. In step 308, for example, the variable Pi+t may be simply be the price of another stock S4 with the variance and distribution then computed in steps 309 and 310. In this manner the investor can be informed on the cross-elastic transfers and even investment flows between exchanges As shown in FIG. 8, the foregoing computations can be displayed as histograms of probability levels arranged by the highest absolute correlation figure [both negative and positive correlation] which display can then be useful to inform the investor of the current investment flow directions. Thus illustrated in FIG. 8 is a set of histograms HS1,1 through HSn,n corresponding to the various cross correlations between the securities S1 through Sn indicating the offsetting directions in the market. This information may be displayed by dollar volume, by securities grouping (e.g., technology, transportation or financials) or may even indicate offsetting flows between indices and exchanges. In each instance a topological display of the cross correlation coefficient CC is provided to indicate visually the highest investment flow directions IF1 through IFn. With these images a quick assessment can be made of any market direction and once made the spreads D1 and D2 can be adjusted to compensate for the offset trends.

Again, these charts can be computed and displayed on the central processing station's screen as a matter of general interest, or may be effected on the local console 14-1–14-n that is interested in one or another form of this information. Thus the investor that is tied to this trading system is informed not only on the securities in his or her portfolio, but also on any offsetting trends into or out of other securities that may have a bearing on the securities held. This information can then be factored into the selection of the increments D1 and D2.

Obviously, many modifications and variations of the foregoing teachings can be made without departing from the spirit of the invention. It is therefore intended that the scope of the invention be determined solely by the claims appended hereto.

The invention claimed is:

1. A method for automatically effecting securities trades comprising the steps of:
    determining the first instance of the most recent preceding transaction price of a security together with a current average price of said security, said current average price of said security corresponding to an average of a predetermined number of preceding transaction prices thereof;
    determining the delay between said preceding transactions and a second instance of the most recent delayed transaction price of said security together with a delayed average price of said security, said delayed average price of said security corresponding to an average of a predetermined number of delayed transaction prices thereof;
    subtracting said most recent transaction price from said current average price to provide a current price difference and said delayed transaction price from said delayed average price to provide a delayed price difference;
    performing a correlation analysis based on said delay between said current price difference and said delayed price difference to produce a correlation coefficient therebetween;
    accumulating said correlation coefficients to produce a distribution thereof;
    converting said distribution to a normal distribution;
    displaying bracketing intervals corresponding to the various probabilities of said normal distribution; and
    effecting a securities trade order by selecting a price together with a selected one of said bracketing intervals.

2. A method according to claim 1, wherein:
    said step of accumulating correlation coefficients further includes the steps of determining the variance of said correlation distribution, obtaining a square root of said variance to provide a numerical indication of one standard deviation and assigning to said variance the characteristics of a normal statistical distribution having a probability corresponding to said standard deviation.

3. A distributed processing system useful in effecting securities transactions, comprising:
    a computer communication network conformed to transmit thereon a first data in the form of electrical signals, said first data including price and volume information concerning securities together with the delay between a preceding securities transaction and the current securities transaction;
    a central processing facility connected to said communication network, said facility including a first processor for processing said first data in accordance with one or more processing instruction sequences, a temporary memory for storing said first data and any output of said first processor, a video display and a permanent memory useful in storing other data and said instruction sequences;
    a plurality of processing consoles each connected to said network and each including a corresponding second processor for processing data in accordance with one or more instruction sequences, a temporary memory for storing such parts of said first data as are directed to said second processor and a second video display;
    said instruction sequences including a first computation sequence for conforming said first or second processor to compute the autocorrelation distribution function based on said delay of the price of a selected one of said securities and displaying on said second video display said distribution function in the form of bracketing intervals according to the statistical distribution thereof and a second instruction instruction sequence for conforming said first processor to match a transaction order in said processing console with another transaction order; and
    selection means included in said processing console for allowing manual selection of one of said bracketing intervals for modifying a selected price within the prices comprising said distribution function.

4. A system according to claim 3, wherein:
    said instruction sequences further include a third instruction sequence conformed to direct said first processor to compute the correlation of the price of one security with the price of other securities.

5. A system according to claim 4, wherein:
    said one and other securities are each market indices.

6. A system according to claim 4, wherein:
    said one security is a fund.

7. A system according to claim 4, wherein:
    said one and said other security are each funds.

8. A system according to claim 4, wherein:
    said one security is a market index.

* * * * *